(12) United States Patent
Eleazer et al.

(10) Patent No.: US 8,293,353 B2
(45) Date of Patent: Oct. 23, 2012

(54) ENERGY ABSORBING PANEL

(75) Inventors: Howell B. Eleazer, Chesnee, SC (US);
Heather J. Hayes, Chesnee, SC (US);
Yunzhang Wang, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 1002 days.

(21) Appl. No.: 12/313,863

(22) Filed: Nov. 25, 2008

(65) Prior Publication Data
US 2012/0177861 A1  Jul. 12, 2012

(51) Int. Cl.
*B32B 3/18* (2006.01)
*B32B 38/10* (2006.01)
*B32B 7/02* (2006.01)

(52) U.S. Cl. ........ 428/119; 428/105; 428/107; 428/111; 428/156; 428/213; 428/364

(58) Field of Classification Search .................. 428/119, 428/111, 105, 107, 156, 213, 364
See application file for complete search history.

(56) References Cited

U.S. PATENT DOCUMENTS

| | | | |
|---|---|---|---|
| 4,309,487 A | 1/1982 | Holmes | 428/516 |
| 4,403,012 A | 9/1983 | Harpell et al. | 428/290 |
| 4,551,296 A | 11/1985 | Kavesh et al. | 264/177 |
| 4,836,084 A * | 6/1989 | Vogelesang et al. | 89/36.02 |
| 4,916,000 A | 4/1990 | Li et al. | 428/105 |
| 4,989,266 A | 2/1991 | Borgese et al. | 2/2.5 |
| 5,124,195 A | 6/1992 | Harpell et al. | 428/245 |
| 5,437,905 A | 8/1995 | Park | 428/105 |
| 5,578,358 A | 11/1996 | Foy et al. | 428/104 |
| 5,597,629 A | 1/1997 | Johnson | 428/36.1 |
| 5,619,748 A | 4/1997 | Nelson et al. | 2/2.5 |
| 5,622,771 A | 4/1997 | Chiou et al. | 428/219 |
| 5,677,029 A | 10/1997 | Prevorsek et al. | 428/113 |
| 6,045,923 A | 4/2000 | Kok et al. | 428/517 |
| 6,054,086 A | 4/2000 | Kurihara et al. | 264/147 |
| 6,156,679 A | 12/2000 | Takaoka et al. | 442/327 |
| 6,408,733 B1 | 6/2002 | Perciballi | 89/36.02 |
| 6,555,488 B1 | 4/2003 | Qiu et al. | 442/205 |
| 6,562,435 B1 | 5/2003 | Brillhart, III et al. | 428/105 |
| 6,824,863 B1 | 11/2004 | Kitayama et al. | 428/299.7 |

(Continued)

FOREIGN PATENT DOCUMENTS

WO  WO 98/42503  10/1998

OTHER PUBLICATIONS

Patent Cooperation Treaty PCT International Search Report. Date of Mailing: Nov. 2, 2009. International Application No. PCT/US2009/004567. International Filing Date: Aug. 10, 2009.

*Primary Examiner* — Brent O'Hern
(74) *Attorney, Agent, or Firm* — Cheryl J. Brickey (57) ABSTRACT

An energy absorbing panel containing a pair of generally parallel spaced apart rigid end plates having a stiffness of at least about 200 N-m and a plurality of fabric layers extending between the rigid end plates oriented in a z-axis direction defined as being perpendicular to the rigid end plates. Each fabric layer contains a plurality of monoaxially drawn, thermoplastic fibers. The plurality of fabric layers are fused together forming a bonded structure. Methods of making the energy absorbing panel are also disclosed.

22 Claims, 8 Drawing Sheets

U.S. PATENT DOCUMENTS

| | | | |
|---|---|---|---|
| 6,861,378 B2 | 3/2005 | Cunningham et al. | 442/135 |
| 7,056,576 B2 | 6/2006 | Johnson | 428/309.9 |
| 7,294,383 B2 | 11/2007 | Callaway et al. | 428/86 |
| 7,294,384 B2 | 11/2007 | Eleazer et al. | 428/86 |
| 7,300,691 B2 | 11/2007 | Callaway et al. | 428/86 |
| 7,318,961 B2 | 1/2008 | Loos et al. | 428/516 |
| 7,387,147 B2 | 6/2008 | Johnson et al. | 156/433 |
| 2004/0242103 A1 | 12/2004 | Loos et al. | 442/185 |
| 2007/0071960 A1 | 3/2007 | Eleazer et al. | 428/297.7 |
| 2007/0105471 A1 | 5/2007 | Wang | 442/301 |
| 2008/0124513 A1 | 5/2008 | Eleazer et al. | 442/327 |

* cited by examiner

ENERGY ABSORBING PANEL

TECHNICAL FIELD

This invention relates generally to energy absorbing panels. More particularly, the invention relates to a panel for absorbing energy from impact by or with an object. Methods of making the energy absorbing panel are also disclosed.

BACKGROUND

Protective armor dates back before the third millennium B.C. As weapons have increased in accuracy and potency, protective armor has been forced to increase comparably. In applications where high energy fragment protection is required as in protection against weapon projectiles or other high-velocity fragment sources, many layers of Kevlar, polyethylene, glass or other ballistic fabric are usually attached to, or placed against, a panel or reinforced skin structure. The design of such panels has not been entirely satisfactory from weight, volume, performance and safety standpoints due to the limited methods used to engineer the panel's performance. For example, in order to have the panels perform against a higher threat level, one would add more layers of material to increase the performance.

Thus, it can be seen that needs exist for improved materials for absorbing energy from impact by or with an object, and for related methods and devices.

SUMMARY

The present invention provides advantages and/or alternatives over the prior art by providing an energy absorbing panel containing a pair of generally parallel spaced apart rigid end plates having a stiffness of at least about 200 N-m and a plurality of fabric layers extending between the rigid end plates oriented in a z-axis direction defined as being perpendicular to the rigid end plates. Each fabric layer contains a plurality of monoaxially drawn, thermoplastic fibers. The plurality of fabric layers are fused together forming a bonded structure. Methods of making the energy absorbing panel are also disclosed.

BRIEF DESCRIPTION OF THE DRAWINGS

The present invention will now be described by way of example only, with reference to the accompanying drawings which constitute a part of the specification herein and in which.

DETAILED DESCRIPTION

Most ballistics and explosion panels are formed from multilayered structures where the bullet or other high velocity object impinges the panel on the face of the layer. Typically these systems will have a strike face that the blast or projectile encounters first. The material behind the strike face is referred to as spall liner and upon impact; the front of the spall liner under goes a compressive force while the back of the liner comes into tension. These two actions work together to mitigate the blast or stop the projectile. This strike face, normally, is penetrated. The typical role of the next layers of the composite is to catch the debris of the strike face and projectile or absorb the blast energy through the compressive and tensile strength of the materials used. To improve the performance of this traditional system, one would add more strike face, more spall liner, a combination of both, or change to higher performing materials.

In the current invention, the energy absorbing panel would also contain a strike face (a rigid plate), but directly behind this strike face, one would place a bonded structure where the fiber or layers are oriented in a z-axis direction, "z-axis direction" being defined as a direction perpendicular to the rigid plates, followed by an additional rigid plate and spall liner if needed. In this orientation, the collision would impact the edges or ends of the fabrics or fibers. Upon an explosive impact to the strike face, the energy would transfer through the strike face to the Z-axis oriented layers or fibers. The force of the impact would cause the Z-axis oriented fibers and layers to compress and crush. During this compressive action on the Z-axis oriented fibers and layers, the surface area of the impact side versus the opposite side changes. This change is an increase in the area on the backside of the composite panel which helps to spread the load of the blast through the system.

Figure 1A:
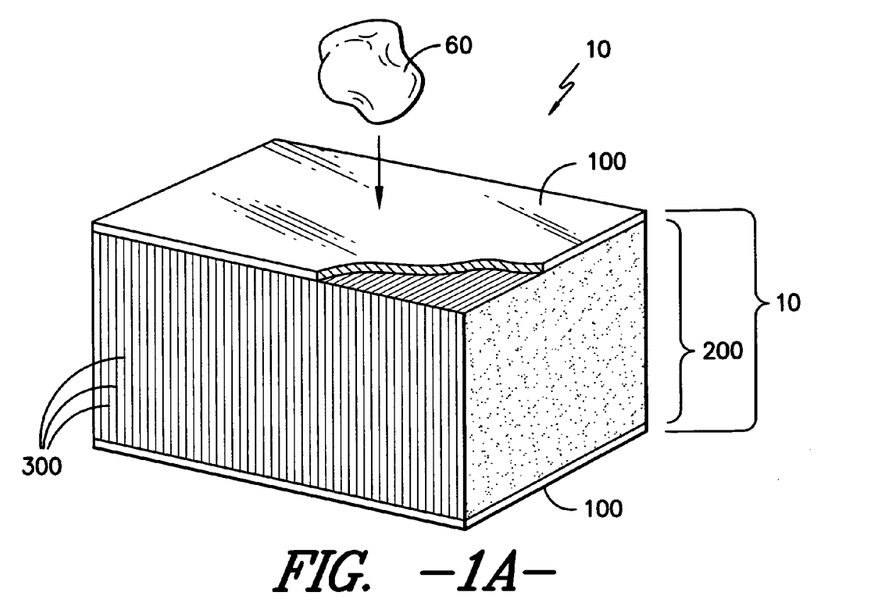
FIG. 1A is an illustrative side view of an exemplary energy absorbing panel showing an end plate forming the strike face for the panel and containing a plurality of fused layers.

Referring now to FIG. 1A, there is shown a cross-sectional view of one embodiment of the energy absorbing panel 10. In the energy absorbing panel 10, there is shown a pair of generally parallel spaced apart rigid end plates 100 with a bonded structure 200 formed from a plurality of layers 300 extending between the rigid end plates 100. "Generally parallel", in this application is defined to be within 10 degrees of parallel. Each of the layers 300 is formed of fusible thermoplastic fibers 308 in woven, non-woven, knit, or unidirectional layers 300. There may be a tie layer of adhesive (not shown) between the bonded structure 200 and rigid end plates 100 in the energy absorbing panel 10. One of the rigid end plates 100 form the strike face of the panel 10 as an object 60 is about to impact the panel 10.

Figure 1B:
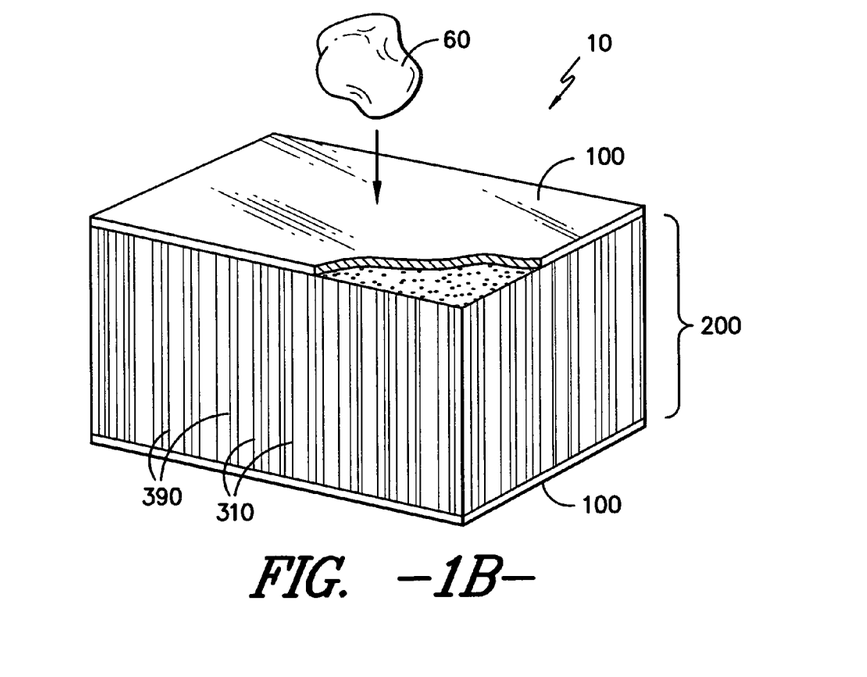
FIG. 1B is an illustrative side view of an exemplary energy absorbing panel showing an end plate forming the strike face for the panel and containing fibers and adhesive.

FIG. 1B illustrates a second embodiment of the invention. In the energy absorbing panel 10, there is shown a pair of generally parallel spaced apart rigid end plates 100 with a bonded structure 200 formed from fibers 310 and optional adhesive 390. The adhesive 390 bonds the fibers 310 and adhesive 390 together into the bonded structure 200. At least 40% of the fibers 310 are oriented in the z-axis direction and the bonded structure 200 contains at least about 50% by volume of fibers 310. In a more preferred embodiment, the bonded structure 200 contains at least 70% by volume fibers 310. There may be a tie layer of adhesive (not shown) between the bonded structure 200 and rigid end plates 100 in the energy absorbing panel 10. One of the rigid end plates 100 form the strike face of the panel 10 as an object 60 is about to impact the panel 10.

The rigid end plates 100 have a stiffness of at least about 200 N-m, more preferably at least about 5,400 N-m. In one embodiment, the rigid end plates 100 have a modulus of at least about 5 GPa, more preferably at least about 10 GPa. When in panel 10 is use, the explosion or bullet impinges these rigid end plates 100. Preferably, the rigid end plates 100 cover the ends of the bonded structure 200 completely. The rigid end plates 100 may be are ballistic steels such as RHA (rolled homogeneous armor), high hard steel, titanium, and aluminum in thicknesses of 2 mm or greater. Other materials that may be used as rigid end plates 10 would be fiber reinforced glass panels. The rigid end plates 100 of the energy absorbing panel 10 may form the outer surface for an installation such as a blast shield or armored vehicle and may have a camouflage pattern or other indicia printed thereon.

The energy absorbing panel 10 preferably has a thickness (measured by the distance between the two rigid plates 100) of at least 3 inches, more preferably at least 1.5 feet. This enables a panel 10 to protect an object behind it from certain types of energy such as bomb explosions, IED's and EFP's. Some threats that the invention panel would be used against are very aggressive and therefore require large amounts of material to stop the penetration of the blast or projectile.

As used herein, "fiber" denotes an elongate body, the length dimension of which is much greater than the transverse dimensions of width and thickness. Accordingly, "fiber" includes monofilament, multi-filament, ribbon, tape, strip, staple and other forms of chopped, cut or discontinuous fiber and the like having regular or irregular cross-sections. The cross-sections of the fibers for use in this invention may vary widely. They may be circular, flat or oblong in cross-section. They also may be of irregular or regular multi-lobal cross-section having one or more regular or irregular lobes projecting from the linear or longitudinal axis of the filament. "Fiber" includes a plurality of any one of the above or a combination of the above.

The embodiment where the bonded structure 200 contains a plurality of layers 300 of fusible thermoplastic fibers 308 that are fused together under heat and/or pressure is shown in FIGS. 1A. The bonded structure 200 containing a plurality of layers 300 that extend between the rigid end plates in a z-axis direction (defined in this application as being within 45 degrees of the normal to the rigid end plates, more preferably within 15 degrees of the normal to the rigid end plates). Preferably, at least 40% of the fusible fibers 308 are oriented in the z-axis direction, more preferably at least 50%. The fusible fibers 308 within the bonded structure 200 may be unidirectional, nonwoven, woven, or knitted to form layers 300. The bonded structure 200 may have a mixture of unidirectional, nonwoven, woven, and knitted layers. Preferably, the fusible fibers 308 have a tenacity of at least 5 or more grams per denier.

The fusible thermoplastic fibers 308 are preferably monoaxially drawn and are preferably tape or monofilament fibers. The fusible fibers 308 may be monofilament or have a sheath or coating of a thermoplastic. This outer layer of thermoplastic helps fuse together the fibers 308 within the layers 300 as well as inter-layers 300. The fibers 308 may be monolayer which soften and fuse under heat and pressure or may have a core layer and at least one skin layer. The skin layer preferably has a melting temperature lower than that of the core layer such that when the layers 300 are heated the skin layers at least partially melt and fuse the fusible fibers 308 together to form the bonded structure 200.

Figure 2:
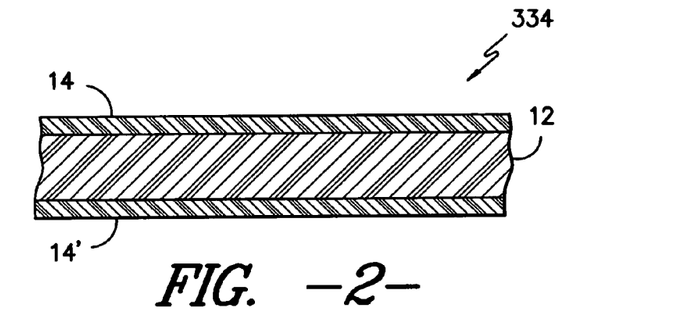
FIG. 2 shows an illustrative cross-section of a tape element.

In some embodiments, the fusible fibers 308 are monoaxially drawn, thermoplastic tape elements 334. A cross-section of a tape element 334 is depicted in FIG. 2 which is made up of a core layer 12 disposed between surface layers 14, 14'. Alternatively, it is contemplated that only a single surface layer may be present, thereby resulting in a construction of a core layer 10 being adjacent to surface layer 14 or that there are no surface layers on the tape elements 334 meaning that the tape elements contain only a core layer 12. The tape element 334 may be formed by any conventional means of extruding, slitting, and stretching such multilayer polymeric films formed by blown film or cast film extrusion followed by slitting into a multiplicity of longitudinal strips of a desired width and then drawing in order to increase the orientation of the core layer 10 so as to provide increased strength and stiffness of the tape element 334.

It is contemplated that the core layer 12 of the tape element 334 is preferably made up of a molecularly-oriented thermoplastic polymer, the core layer 12 being fusible to each of surface layers 14, 14' at their respective intersections. The core layer 12 is compatibly bonded to each of surface layers 14, 14' between their contiguous surfaces. It is further contemplated that the surface layers 14, 14' have a softening temperature, or melting temperature, lower than that of the core layer 12. By way of example only, it is contemplated that the core layer 12 is a polyolefin polymer such as polypropylene, polyethylene, polyester such as polyethyleneterephthalate, or a polyamide such as Nylon 6 or Nylon 6-6. According to one potentially preferred practice, the core layer 12 may be polypropylene or polyethylene. The core layer 12 may account for about 50-99 wt. % of the tape element 334, while the surface layers 14, 14' account for about 1-50 wt. % of the tape element 334. The core layer 12 and surface layers 14, 14' being made up of the same class of materials to provide an advantage with regard to recycling, as the core layer 12 may include production scrap.

In an embodiment with a core layer 12 of polypropylene, the material of surface layers 14, 14' is preferably a copolymer of propylene and ethylene or an olefin. Particularly advantageous results have been achieved by using a random copolymer of propylene-ethylene. It may be preferred to use said copolymer with an ethylene content of about 1-25 mol. %, and a propylene content of about 75-99 mol. %. It may be further preferred to use said copolymer with a ratio of about 95 mol. % propylene to about 5 mol. % ethylene. Instead of said copolymer or in combination therewith, a polyolefin, preferably a polypropylene homopolymer or polypropylene copolymer, prepared with a metallocene catalyst, may be used for the surface layers 14, 14'. It is also contemplated that materials such as poly-4-methyl-1-pentene (PMP) and polyethylene may be useful as a blend with such copolymers in the surface layers 14, 14'. The surface layer material should be selected such that the softening point of the surface layer 14, 14' is at least about 10° C. lower than that of the core layer 12, and preferably between about 15-40° C. lower. The upper limit of this difference is not thought to be critical, and the difference in softening points is typically less than 70° C. After the drawing process is complete, the tape elements 334 are in the range of about 1.5 to about 5 millimeters wide.

Figure 3:
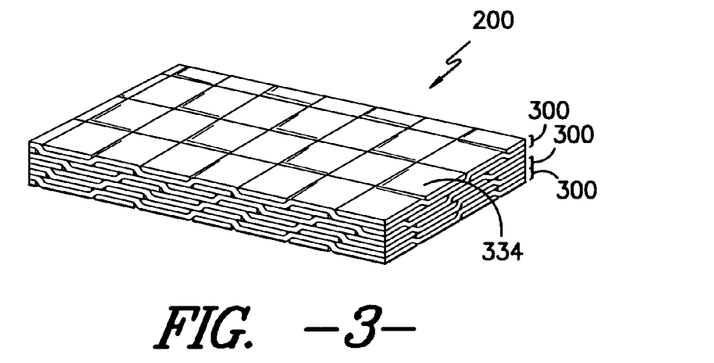
FIG. 3 shows an illustrative cross-sectional view of a fusible fiber being a tape element.

FIG. 3 illustrates a bonded structure 200 formed from a plurality of layers 300 of fusible fibers 308 being woven tape elements 334. The rigid end plates 100 are not shown so as to more clearly show the edges of the plurality of layers 300. The tape elements layers 334 are woven from a multiplicity of warp strips of tape elements 334 running in the warp direction and fill strips of tape elements 334 running in the fill direction in transverse relation to the warp strips. As shown, the fill strips are interwoven with the warp strips such that a given fill strip extends in a predefined crossing pattern above and below the warp strips. In the illustrated arrangement, the fill strips and the warp strips are formed into a so called plain weave wherein each fill strip passes over a warp strip and thereafter passes under the adjacent warp strip in a repeating manner across the full width of the layer. However, it is also contemplated that any number of other weave constructions as will be well known to those of skill in the art may likewise be utilized. By way of example only, and not limitation, it is contemplated that the fill strips may pass over two or more adjacent warp strips before transferring to a position below one or more adjacent warp strips thereby forming a twill weave. It is likewise contemplated that the mat may utilize other interwoven constructions including knit constructions, weft insertion constructions and the like if desired. Thus, the terms "woven" and "interwoven" are meant to include any construction incorporating interengaging formation strips.

Figure 4:
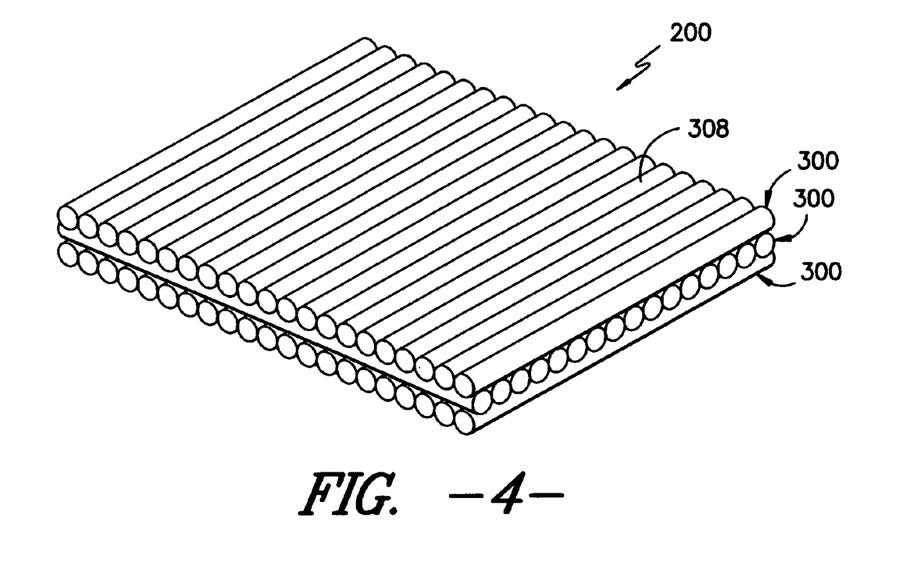
FIGS. 4-5 show embodiments bonded structures containing layers of fusible fibers.

FIG. 4 illustrates a bonded structure 200 formed from a plurality of layers 300 of unidirectional fusible fibers 308. The rigid end plates 100 are not shown so as to more clearly show the edges of the plurality of layers 300. The fusible fibers 308 in this embodiment are substantially circular in cross-section and the fiber directions are rotated 90 degrees between each layer 300. While tape and circular cross-section fibers 308 and woven and unidirectional layers were shown in FIGS. 3 and 4, any shape fusible fiber 308 and any construction (and combinations thereof) may be used in the bonded structure 200.

In another embodiment, the bonded structure 200 contains a plurality of fibers 310 and adhesive 390 fused together where at least 40% of the fibers 310 are oriented in the z-axis direction and the bonded structure contains at least about 50% by volume of fibers 310. In a more preferred embodiment, the bonded structure 200 contains at least 70% by volume fibers 310. The bonded structure 200 may include fibers 310 that are arranged knit, woven, non-woven, or unidirectional layers and layered in an alternating pattern with an adhesive layer or may include individual fibers 310 in an adhesive matrix. These fibers 310 are typically not fusible at the typical consolidation temperatures and pressures and therefore the adhesive 390 helps to fuse the fibers 310 into a bonded structure 200. In one embodiment, the fibers 310 are continuous between the two rigid end plates 100. In another embodiment, a mixture of fusible fibers 308 is used in combination with non-fusible fibers 310, with or without adhesive 390. The fiber 310 and adhesive layers 390 are typically consolidated using a combination of heat and pressure to form the bonded structure 200, but the adhesive 390 may also be activated using heat, pressure, UV energy, or other known activation means.

In one embodiment, the fibers 310 have a modulus of about 40 to 750 GPa and the adhesive layers 390 have a melting point of between 75 and 200° C. Preferably, the adhesive layer 390 is an olefin polymer and may be a free standing layer, sprayed on, solvent coated, powder coated, extruded, or applied in any other known method. In another embodiment, the fibers 310 are brittle, "brittle" being defined as being unable to be bent to a radius tighter than 0.5 cm without breaking. The brittleness of fibers 310 is significant because when the brittle fibers 310 are placed in the Z-axis direction between the two rigid end plates and the panel 10 is impinged, the brittle fibers 310 crush upon impact absorbing the energy of the impact. Some examples of brittle fibers 310 include glass fibers, carbon fibers, ceramic fibers, or mixtures thereof.

In another embodiment, the fibers 310 can comprise high tenacity and high modulus fibers, which refers to fibers that exhibit a relatively high ratio of stress to strain when placed under tension, preferably having a tenacity of about 8 or more grams per denier. Fibers 310 suitable for use in the bonded structure 200 with adhesive 390 include, but are not limited to, fibers made from highly oriented polymers, such as gel-spun ultrahigh molecular weight polyethylene fibers (e.g., SPECTRA® fibers from Honeywell Advanced Fibers of Morristown, N.J. and DYNEEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), and sintered polyethylene fibers (e.g., TENSYLON® fibers from ITS of Charlotte, N.C.). Suitable fibers also include those made from rigid-rod polymers, such as lyotropic rigid-rod polymers, heterocyclic rigid-rod polymers, and thermotropic liquid-crystalline polymers. Suitable fibers made from lyotropic rigid-rod polymers include aramid fibers, such as poly (p-phenyleneterephthalamide) fibers (e.g., KEVLAR® fibers from DuPont of Wilmington, Del. and TWARON® fibers from Teijin of Japan) and fibers made from a 1:1 copoly-terephthalamide of 3,4'-diaminodiphenylether and p-phenylenediamine (e.g., TECHNORA® fibers from Teijin of Japan). Suitable fibers made from heterocyclic rigid-rod polymers, such as p-phenylene heterocyclics, include poly(p-phenylene-2,6-benzobisoxazole) fibers (PBO fibers) (e.g., ZYLON® fibers from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxy)phenylene] fibers (PIPD fibers) (e.g., M5® fibers from DuPont of Wilmington, Del.). Suitable fibers made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable fibers also include carbon fibers, such as those made from the high temperature pyrolysis of rayon, polyacrylonitrile (e.g., OPF® fibers from Dow of Midland, Mich.), and mesomorphic hydrocarbon tar (e.g., THORNEL® fibers from Cytec of Greenville, S.C.

Figure 5:
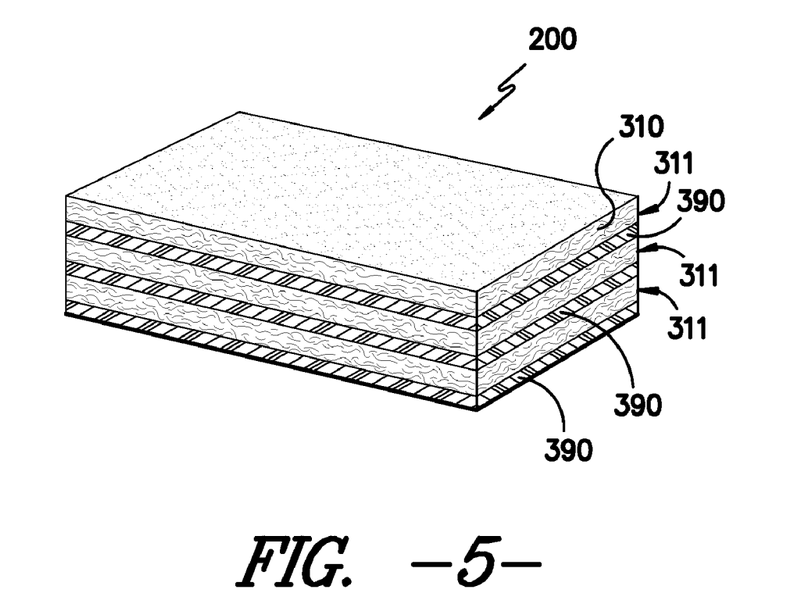
Figure 6:
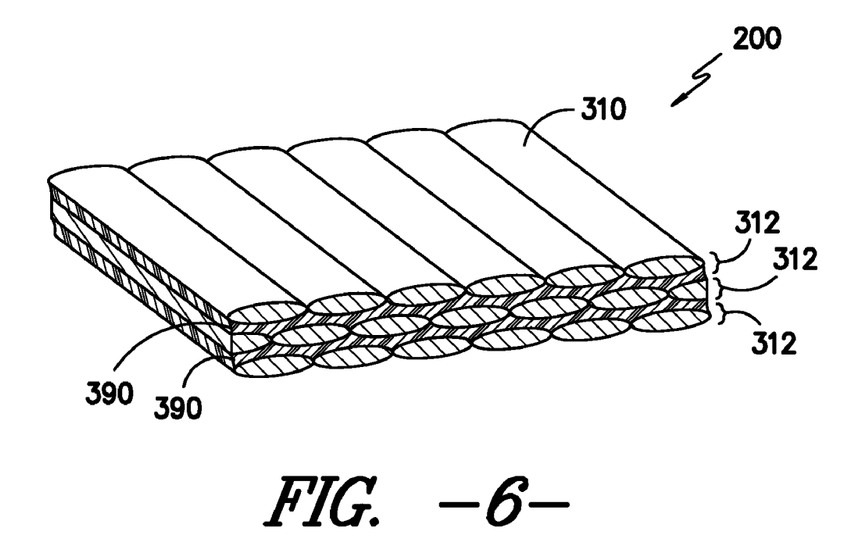
FIGS. 6-8 show embodiments bonded structures containing fibers and adhesive.

FIG. 5 illustrates a bonded structure 200 formed from alternating non-fusible fiber non-woven layers 311 and adhesive 390. The adhesive 390 may be applied to the individual fibers 310 or to the non-woven layers 311 to bind the fibers 310 within each layer 311 and bind the layers together. In FIG. 6 shows a bonded structure 200, the fibers 310 laid in a unidirectional manner to form a unidirectional fiber layer 312. The unidirectional fiber layers 312 are stacked in an alternating fashion with adhesive 390. In one embodiment the fibers 310 in the unidirectional layer 312 do not overlap one another, and may have gaps between the fibers 310. In another embodiment, the fibers 310 may overlap one another up to 90% in the unidirectional layer 312. The adhesive 390 may be applied to the individual fibers 310 or to the fiber layers 312 to bind the fibers 310 within each layer and bind the layers 312 together. While FIGS. 5 and 6 illustrate fibers 310 in non-woven and unidirectional layers, the fibers 310 may also be in knit or woven layers, or combinations of any of the constructions.

Figure 7:
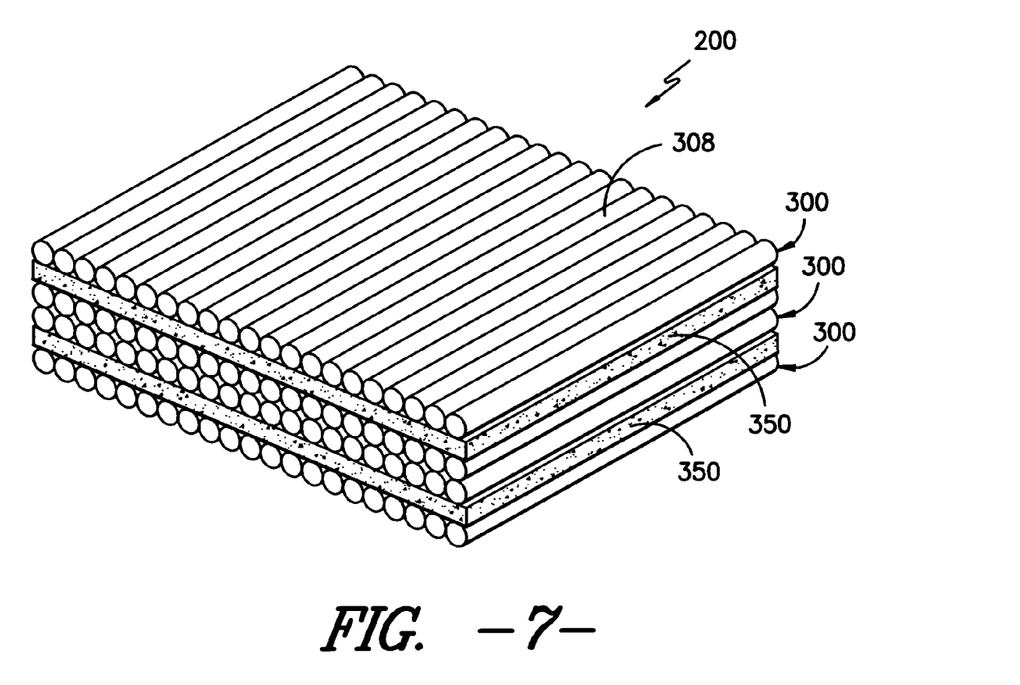
Figure 8:
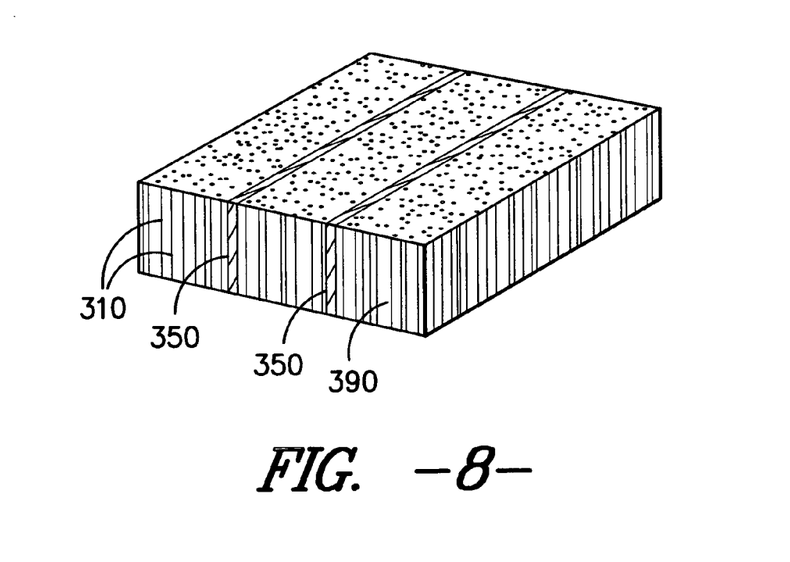

Additional support layers may be optionally placed in the bonded structure 200 for additional energy absorption. Preferably, the support layers have a modulus of at least twice that of the fibers 310 and/or fabric layers 300. When the bonded structure 200 contains fabric layers 300 of fusible fibers 308 or layers of non-fusible fibers 310, the support layers preferably are parallel to these layers. These support layers include, but are not limited to aluminum foil or plates, fiberglass or carbon fiber fabric layers, wood, foam, polycarbonate films, and thermoset polymer layers. The support layers may be placed in a random or repeating pattern of insertion between the layers. FIG. 7 illustrates multiple layers 300 of circular cross-sectional fusible thermoplastic fibers 308 with support layers 350 being aluminum between at least 2 of the layers. FIG. 8 illustrates the bonded structure 200 containing non-fusible fibers 310, adhesive 390, and support layers 350, where the support layers 350 are woven fiberglass impregnated with a UV cured resin. Additional adhesive may be needed to attach the support layers 350 to the other elements within the bonded structures 200.

Figure 9:
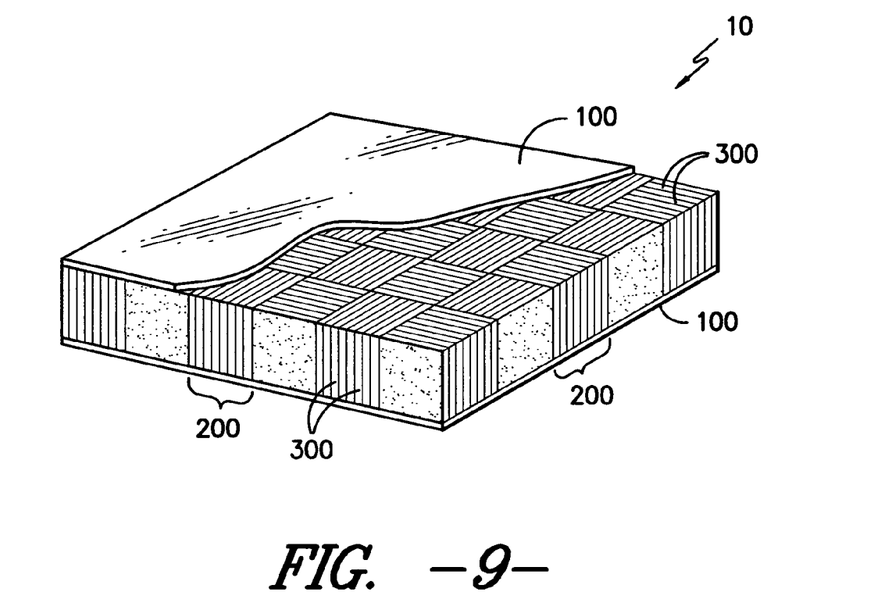
FIG. 9 is an illustrative side view of the "parquet-like" embodiment of the energy absorbing panel.

FIG. 9 shows another embodiment of the energy absorbing panel 10, described herein as the parquet-like pattern. The panel 10 contains a pair of coaxially spaced apart rigid end plates 100, where the end plates have a stiffness of at least about 200 N-m and a plurality of bonded structures 200. Each bonded structure 200 contains a plurality of fused together layers 300 extending between the rigid end plates 100, where the layers 300 from one fused layer 200 structure are perpendicular to the layers 300 from the adjacent bonded structures 200. The layers may be fabric layers of fusible thermoplastic fibers 308 or alternating fabric layers of non-fusible fibers 310 and adhesive 390 (not shown). This orientation of the bonded structures 200 relative to one another forms a parquet-like pattern. It has been found that this orientation of bonded structures 200 within the panel 10 forms a very efficient energy absorbing panel 10.

Figure 10:
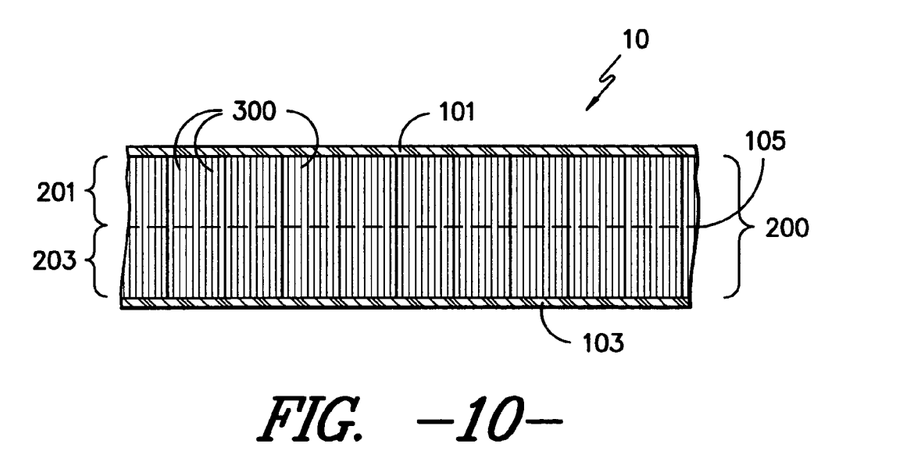
FIG. 10 is an illustrative view of an exemplary energy absorbing panel of the invention having an internal boundary and two bonded structures where the layers from the first bonded structure are parallel to the layers from the second bonded structure.
Figure 11:
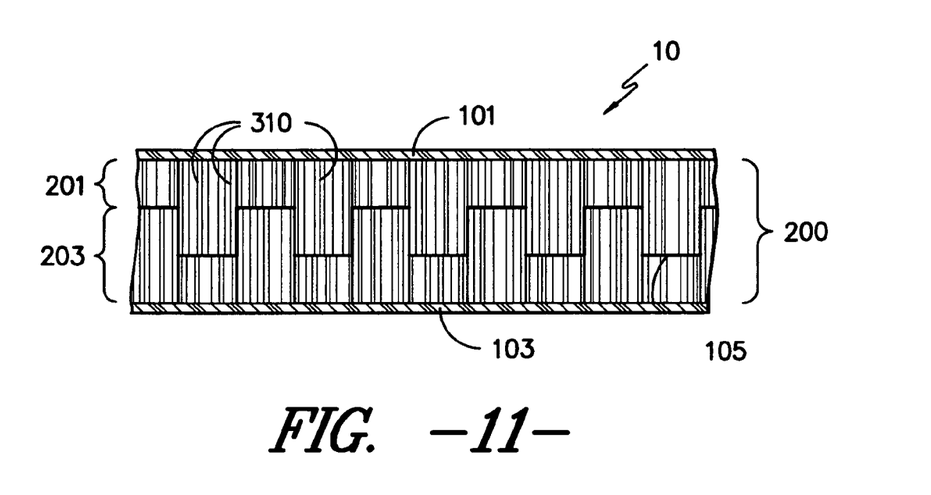
FIG. 11 is an illustrative view of an exemplary energy absorbing panel of the invention having an internal boundary containing step changes along the plane and two bonded structures where the layers from the first bonded structure are parallel to the layers from the second bonded structure.
Figure 12:
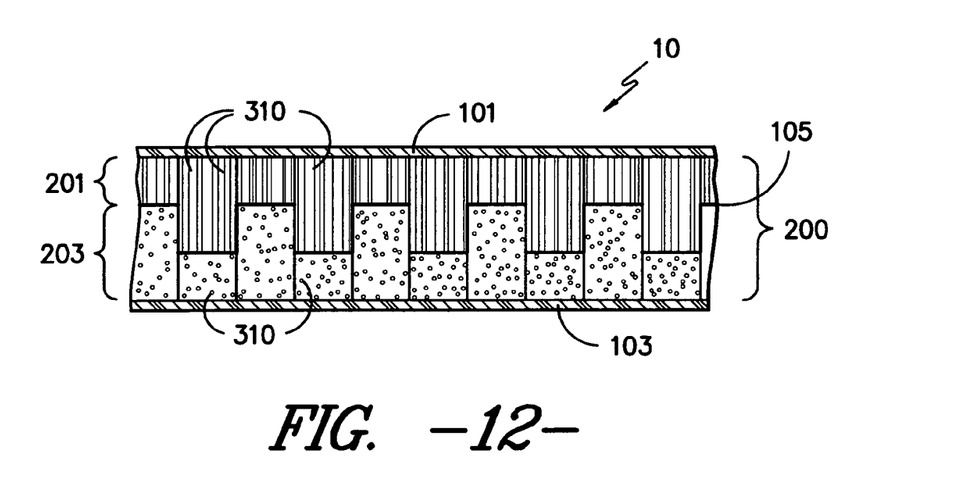
FIG. 12 is an illustrative view of an exemplary energy absorbing panel of the invention having an internal boundary containing step changes along the plane and two bonded structures where the layers from the first bonded structure are perpendicular to the layers from the second bonded structure.

FIGS. 10-12 illustrate an alternative embodiment of the energy absorbing panel 10 where the panel 10 contains a pair of generally rigid plates (a first end plate 101 and a second end plate 103) and an internal boundary 105. The internal boundary 105 is located between and is parallel to the rigid end plates 101 and 103. In FIG. 10, the internal boundary 105 is shown approximately equidistant to the first and second rigid end plates 101 and 103, but the internal boundary 105 is not limited to this location. The internal boundary 105 may be located anywhere between the two end plates 101, 103. The internal boundary 105 separates the bonded structure 200 into a first bonded structure 201 and a second bonded structure 203. The internal boundary may be an imaginary plane from which two bonded structures meet or may be an actual layer of adhesive, rigid plate, support layer, or fabric structure. While FIG. 10 is shown with the first and second bonded structures 201 and 203 formed from a plurality of fused layers 300, the fused layers 300 could be replaced with a plurality of fibers 310 and adhesive 390 as described with respect to the bonded structures 200. The layers 300 from the first bonded structure 201 extend between the first rigid plate 101 and the internal boundary 105 and the layers 300 from the second fused layer 205 extend between the internal boundary 105 and the second rigid end plate 103.

In FIG. 10, the layers 300 in the first bonded structure 201 are generally parallel to the layers 300 in the second bonded structure 203. The internal boundary 105 in the panel 10 may be a flat plane as shown in FIG. 10, but may also contain step changes within internal boundary as shown in FIG. 11. FIG. 11 illustrates a panel 10 having a first rigid plate 101, a second rigid plate 103, and an internal boundary 105, where the internal boundary lies between rigid end plates 101 and 103. In this Figure, a portion of the internal boundary 105 is generally parallel to the end plates, but parts of the internal boundary 105 are not parallel to the end plates forming a step pattern in the internal boundary 105. In addition to the example shown, the internal boundary may also curve, undulate, or be at an angle to the rigid end plates 101, 103. The panel 10 may also contain two or more internal boundaries 105, with the panel then containing a first bonded structure, a second bonded structure, a third bonded structure, etc.

FIGS. 11 and 12 show alternative orientations of the layers 300 within the first and second bonded structures 201 and 203. FIG. 11 illustrates where the layers 300 in the first bonded structure 201 are generally parallel to the layers 300 in the second bonded structure 203. In FIG. 12, the layers 300 in the first bonded structure 201 are generally perpendicular to the layers 300 in the second bonded structure 203.

Figure 13:
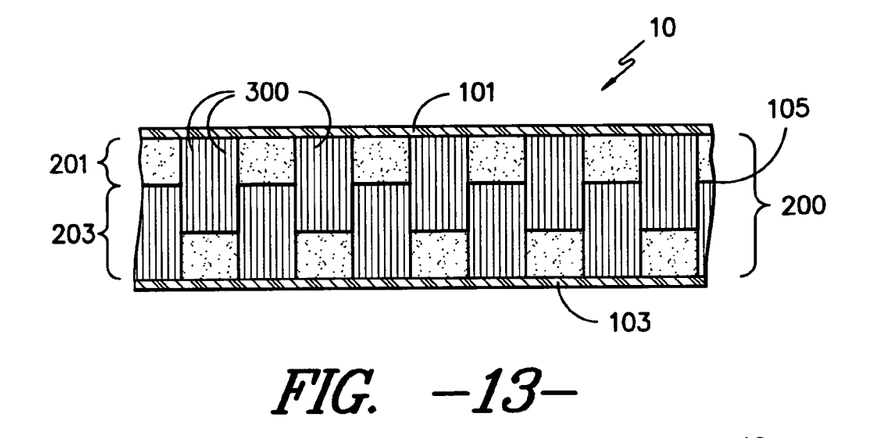
FIG. 13 is an illustrative view of an exemplary energy absorbing panel of the invention having an internal boundary containing step changes along the plane and two bonded structures each having a "parquet-like" pattern.
Figure 14:
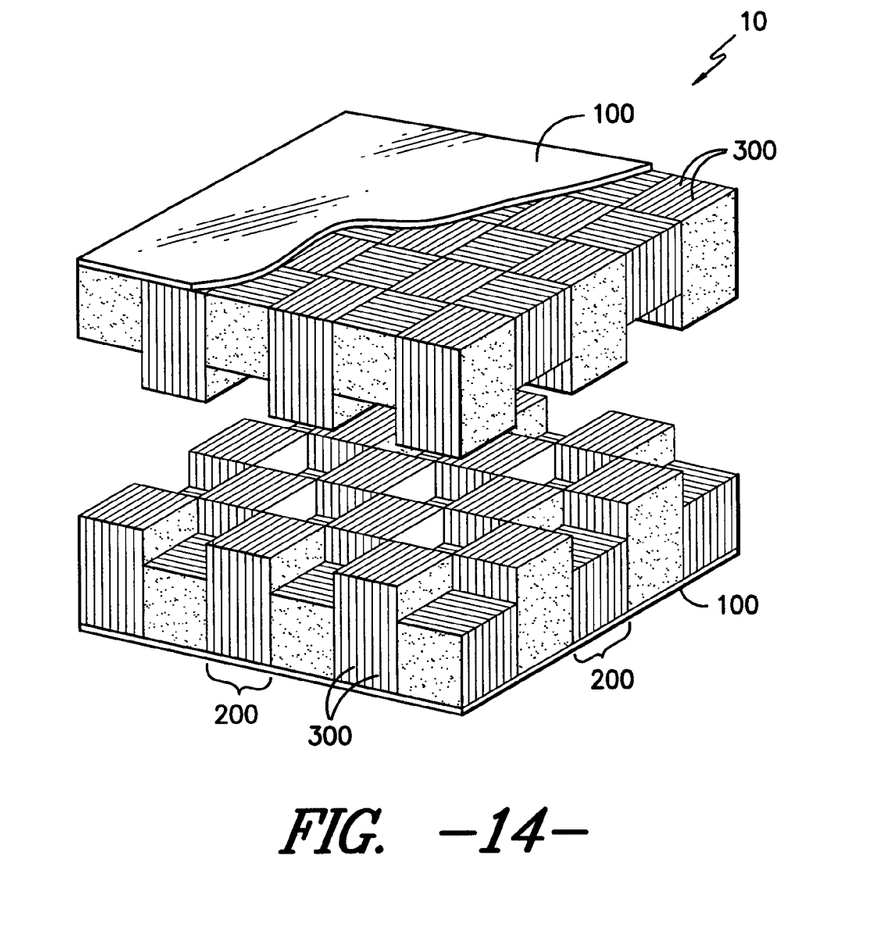
FIG. 14 is a illustration of FIG. 13 opened up along the internal boundary plane; and, FIGS. 15-16 are graphs of compression testing of the Examples.

FIG. 13 illustrates a combination of the parquet-like pattern shown in FIG. 9 in combination with an internal boundary 105 forming two bonded structures 201 and 203. Within each of the bonded structures 201 and 203, some of the layers 300 are perpendicular to one another. The layers 300 from the first bonded structure 201 are perpendicular to the layers 300 in the second bonded structure 203. FIG. 14 is an illustration of FIG. 13 opened up along the internal boundary plane 105.

In addition to the rigid plates 100, there may be additional outside framing around the bonded structure 200. The framing preferably covers at least one side of the bonded structure 200 not covered by the rigid plates 100. Preferably, each side of the bonded structure 200 not covered by the rigid plates 100 is covered by a framing material. Preferably the framing material has a stiffness of at least about 200 N-m. If an impact was to take place on an outer portion of the energy absorbing panel 10, the bonded structure 200 might split and therefore not absorb the impact as well as if the impact was in the center of the panel 10. The framing holds the bonded structure 200 together and helps absorb impacts on the outer portions of the panel 10.

The process of forming an energy absorbing panel 10 begins with forming the bonded structure 200. In a first embodiment, the bonded structure 200 contains plurality of fusible layers 300. In the fusible layers may be inserted additional layers of thermoplastic tapes and/or fibers, fiberglass fibers, carbon fibers, foam layers, and/or aluminum. In one embodiment, individual fusible layers 300 may be fused as single consolidated layers first. For example, a layer 300 of woven tape elements 334 may be heated to form a layer that is easier to handle, stack, and cut or all of the layers may be stacked and then the entire structure 200 may be fused together.

Next, several layers of layers 300 may be arranged in layered relation prior to the application of heat and pressure in order to form the bonded structure 200. The layers of bonded structure 200 may be formed from a single layer that is repeatedly folded over itself, or from several discrete overlaid layers. Alternatively, a bonded structure 200 may be formed by reheating several previously fused layers or groups of fused layers. When such previously fused material is subjected to a temperature above the softening point of the surface layers or adhesive, the surface layers or adhesive will again melt bonding the layers together.

Next, the bonded structure is cut to the desired thickness needed in the final panel, turned perpendicular (into the Z direction) and stacked together side by side until the desired length of the bonded structure 200 is reached. Additional adhesive may be needed to be placed between the sections of the bonded structure 200 to hold the structure together.

Finally, the bonded structure is sandwiched between a pair of coaxially spaced apart rigid end plates, wherein the end plates have a stiffness of at least about 200 N-m, such that the plurality of layers extend in a z-axis direction perpendicular to the rigid end plates. A tie layer of adhesive may be placed between the bonded structure 200 and the rigid end plates 100 to more strongly adhere the panel 10 together.

In a second embodiment where the bonded structure 200 contains fibers 310 and adhesive 390, the process begins with fibers 310 being arranged into fabric layers with adhesive between the layers, or individual fibers 310 being combined with adhesive 390. In the bonded structure 200 may be inserted additional layers of thermoplastic tapes and/or fibers, fiberglass fibers, carbon fibers, foam layers, and/or aluminum. The adhesive is activated using heat, pressure, UV, or other means to consolidate the fibers and adhesive into a bonded structure.

Next, the bonded structure is cut to the desired thickness needed in the final panel, turned perpendicular (into the Z direction) and stacked together side by side until the desired length of the bonded structure 200 is reached. Additional adhesive may be needed to be placed between the sections of the bonded structure 200 to hold the structure together. The bonded structure is then sandwiched between a pair of generally parallel rigid end plates, wherein the end plates have a stiffness of at least about 200 N-m, such that at least 40% of the fibers 310 extend in a z-axis direction perpendicular to the rigid end plates. A tie layer of adhesive may be placed between the bonded structure 200 and the rigid end plates 100 to more strongly adhere the panel 10 together.

The bonded structure may be made formed by various manufacturing methods so that the amount of energy needed to crush the fibers 308, 310 can be tailored to the need. The rigid end plate behind the bonded structure is a stiffness needed to allow the Z direction to crush and this can be engineered based on the expected blast energy. This panel could be used in the bottom of armored vehicles to reduce and absorb the energy from the blast. It could also be used in buildings to mitigate a blast event. Other uses may be for protection against IEDs (improvised explosive devises) that threaten our military vehicles today and EFP's or explosively formed projectiles.

EXAMPLES

Each of the examples were formed 200 layers of fusible fibers being tape elements woven in a 2×2 twill pattern with 11 ends/inch and 11 picks/inch. The tape elements had a thickness of 65 μm and a width of 2.2 mm with a polypropylene core layer surrounded by two polypropylene copolymer surface layers. The surface layers comprised about 15% by thickness of the total tape element. The tape element has a tensile strength of approximately 7 g/d and a tensile modulus of approximately 126 g/d. The resultant structure was cut such that the examples formed a cubic bonded structure with 1 inch faces and had an aerial density of 4.0 psf. There were no end plates added to the bonded structure. The temperature and conditions that the bonded structure was formed varied and is summarized in the following table:

TABLE 1

Forming Conditions for Examples

| | Platen Temp (° F.) | Core Temp (° F.) | Pressure (psi) | Mode Tested |
|---|---|---|---|---|
| Comparison Ex. 1 | 300 | 280 | 80 | Flat |
| Invention Ex. 2 | 300 | 280 | 80 | Edge |

Next the cubed shaped bonded structures were compression tested according to ASTM C 365 Flatwise Compressive Properties of Sandwich Cores. In a first test, the loaded platens were placed parallel to the layers in the bonded structure making the compression force perpendicular to the fabric plies; these samples are marked as "Flat" in Mode Tested. In a second test, the loaded platens were placed perpendicular to the layers in the bonded structure making the compressing force parallel with the fabric plies; these samples are marked as "Edge" in Mode Tested. The loaded platens acted as the rigid ends plates for the energy absorbing panels. The tests were carried out to 9500 psi or 75% strain, which ever came first and were repeated 3 times. The results of stress in psi versus Strain (%) for each of the samples are shown in FIGS. 11-18.

TABLE 2

Average Energy to Peak (Stress-Strain) in $lb_f$ of Examples

| Example | Graph Shown in | Average Energy to Peak (Stress-Strain) in $lb_f$ | Energy to Peak (in * $lb_f$) |
|---|---|---|---|
| Comp. Ex. 1 | FIG. 15 | 1.052 | 678.9 |
| In. Ex. 2 | FIG. 16 | 3.224 | 2080.0 |

The support plate of the composite needs to be able to support the crushing of the z-direction fibers. In doing so, the force is crushing the fibers rather than transferring the energy to the back plate and giving way (bending) in the direction of the force. The end result is less back face deformation of the composite panel. If the composite panel were in the floor of a vehicle, the blast would not be readily transferred into the cab, thus better protecting the occupants. Preferably, the back plate (rigid end plate) would not deflect more than 30 degrees off normal as the fibers crush.

Figure 15:
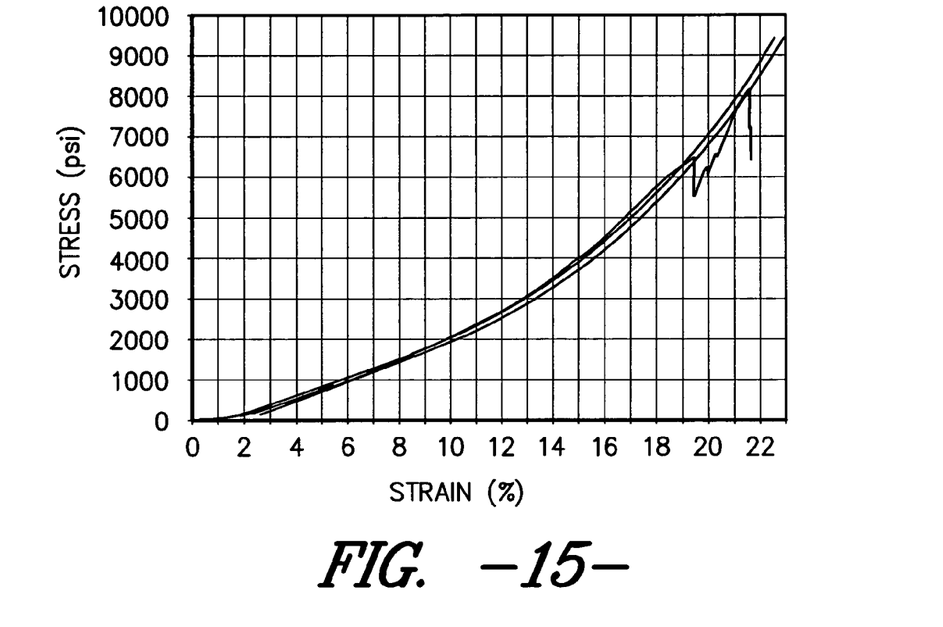
Figure 16:
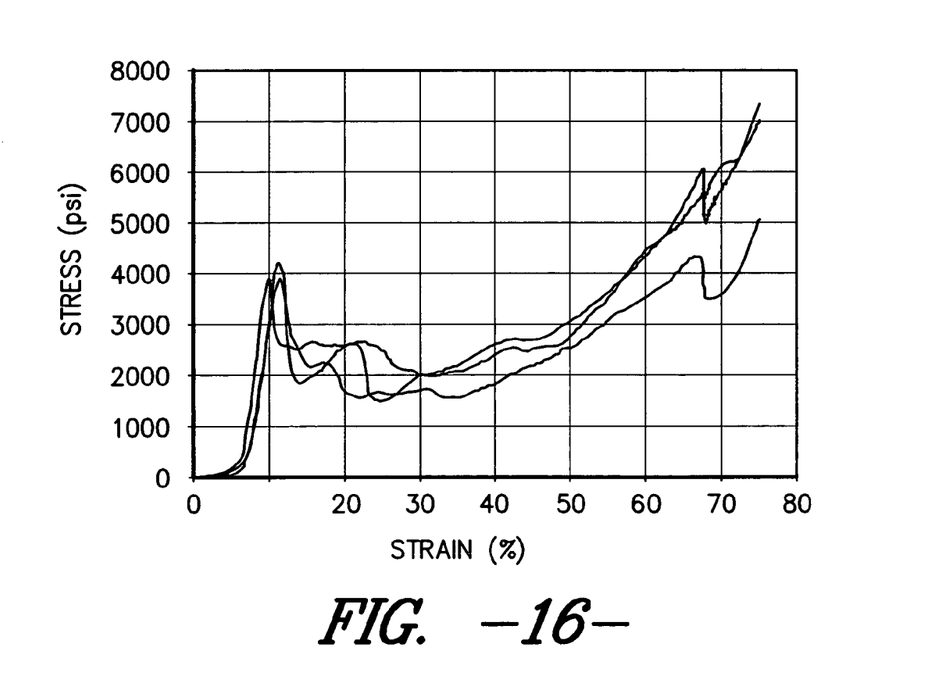

The area under the curve of the graphs is the energy absorption. As the graphs show by comparing samples created using the same conditions (Ex 1 and 2), the average energy absorption of the samples (energy to peak (stress-strain) in $lb_f$) of the samples tested on "Edge" were approximately three times the samples tested on "Flat" as shown in Table 2. The Edge samples tested to "mushroom" out absorbing the force. This makes the samples where the load was applied perpendicular to the layers of fused material (Edge) significantly better at absorbing large explosions such as bombs and IEDs (improvised explosive devices) as compared to traditional absorbing panels where the blow sticks the face of the layers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An energy absorbing panel comprising:
   a pair of generally parallel spaced apart rigid end plates having a stiffness of at least about 200 N-m; and,
   a plurality of fabric layers, wherein each fabric layer has a first major face, a second major face, and a thickness between the first and second major faces, wherein the fabric layers extend between the rigid end plates such that the first major faces and second major faces are oriented in a z-axis direction defined as being perpendicular to the rigid end plates, wherein each fabric layer comprises a plurality of fusible thermoplastic fibers, and wherein the plurality of fabric layers are fused together forming a bonded structure, and wherein the fusible thermoplastic fibers are thermoplastic tape elements comprising a base layer of a strain oriented polymer and at least one covering layer of a heat fusible polymer on the base layer, wherein the covering layer is characterized by a softening temperature below that of the base layer to permit fusion bonding upon application of heat.

2. The energy absorbing panel of claim 1, wherein at least 40% of the fusible thermoplastic fibers are oriented in the z-axis direction.

3. The energy absorbing panel of claim 1, wherein the fusible thermoplastic fibers are thermoplastic tape elements comprising a base layer of a strain oriented polymer sandwiched between two covering layers of a heat fusible polymer, wherein the covering layers are characterized by a softening temperature below that of the base layer to permit fusion bonding upon application of heat.

4. The energy absorbing panel of claim 1, wherein the plurality of layers extend for a length of at least about 3 inches between the apart rigid end plates.

5. The energy absorbing panel of claim 1, wherein the fusible thermoplastic fibers are monoaxially drawn.

6. The energy absorbing panel of claim 1, wherein the fabric layers are selected from the group consisting of non-woven layers, woven layers, knit layers, unidirectional layers, and mixtures thereof.

7. The energy absorbing panel of claim 1, wherein the bonded structures further comprise support layers, wherein the support layers are parallel the fabric layers, and wherein the support layers have a modulus of at least twice the modulus of the fabric layers.

8. An energy absorbing panel comprising:
   a pair of generally parallel spaced apart rigid end plates having a stiffness of at least about 200 N-m; and,
   a bonded structure comprising a plurality of fusible thermoplastic fibers, wherein the bonded structure is located between the rigid end plates, wherein at least 40% of the fibers are oriented in a z-axis direction defined as being perpendicular to the rigid end plates, wherein bonded structure contains at least about 50% by volume fibers, and wherein the fusible thermoplastic fibers are thermoplastic tape elements comprising a base layer of a strain oriented polymer and at least one covering layer of a heat fusible polymer on the base layer, wherein the covering layer is characterized by a softening temperature below that of the base layer to permit fusion bonding upon application of heat.

9. The energy absorbing panel of claim 8, wherein the bonded structure further comprises adhesive.

10. The energy absorbing panel of claim 8, wherein the bonded structures contain at least about 70% by volume fibers.

11. The energy absorbing panel of claim 8, wherein the bonded structure further comprise support layers, wherein each support layer has a first major face, a second major face, and a thickness between the first and second major faces, the support layers extend between the rigid end plates such that the first major faces and second major faces are oriented in the z-axis direction, and wherein the support layers have a modulus of at least twice the modulus of the fibers.

12. The energy absorbing panel of claim 8, wherein the fibers break when bent to a radius of about 0.5 cm or less.

13. The energy absorbing panel of claim 8, wherein the fibers are selected from the group consisting of fiberglass, carbon fibers, and mixtures thereof.

14. An energy absorbing panel comprising:
   a pair of generally parallel spaced apart rigid end plates, having a stiffness of at least about 200 N-m; and,
   at least a first bonded structure and an adjacent second bonded structure, wherein the first and second bonded structures each comprise a plurality of fused together layers, wherein each layer contains a first major face, a second major face, and a thickness between the first and second major faces, wherein the layers extend between the rigid end plates such that the first major faces and second major faces are oriented in a z-axis direction defined as being perpendicular to the rigid end plates, wherein the layers from the first bonded structure are perpendicular to the layers from the adjacent second bonded structure, and wherein each layer comprises fusible thermoplastic fibers in a construction selected from the group consisting of woven, non-woven, knit, or unidirectional, and mixtures thereof, and wherein the fusible thermoplastic fibers are thermoplastic tape elements comprising a base layer of a strain oriented polymer and at least one covering layer of a heat fusible polymer on the base layer, wherein the covering layer is characterized by a softening temperature below that of the base layer to permit fusion bonding upon application of heat.

15. The energy absorbing panel of claim 14, wherein the fibers comprise a base layer of a strain oriented polymer sandwiched between two covering layers of a heat fusible polymer, wherein the covering layers are characterized by a softening temperature below that of the base layer to permit fusion bonding upon application of heat.

16. The energy absorbing panel of claim 14, wherein the plurality of layers extend for a length of at least about 3 inches between the apart rigid end plates.

17. An energy absorbing panel comprising:
a pair of generally parallel spaced apart first and second rigid end plates and an internal boundary plane, wherein the internal boundary is located between the rigid end plates, and wherein the end plates have a stiffness of at least about 200 N-m; and,
a first bonded structure and a second bonded structure, wherein each bonded structure comprises a plurality of fabric layers, wherein each fabric layer contains a first major face, a second major face, and a thickness between the first and second major faces, wherein the fabric layers extend between the rigid end plates such that the first major faces and second major faces are oriented in a z-axis direction defined as being perpendicular to the rigid end plates, wherein each fabric layer comprises a plurality of fusible thermoplastic fibers, wherein the plurality of fabric layers are fused together forming a bonded structure, wherein the layers from the first bonded structure extend between the first rigid plate and the internal boundary and the layers from the second bonded structure extend between the internal boundary and the second rigid end plate, and wherein the fusible thermoplastic fibers are thermoplastic tape elements comprising a base layer of a strain oriented polymer and at least one covering layer of a heat fusible polymer on the base layer, wherein the covering layer is characterized by a softening temperature below that of the base layer to permit fusion bonding upon application of heat.

18. The energy absorbing panel of claim 17, wherein the internal boundary is generally parallel to the first and second rigid end plates.

19. The energy absorbing panel of claim 17, wherein at least a portion of the internal boundary is generally parallel to the rigid end plates and at least a portion of the internal boundary is generally perpendicular to the rigid end plates.

20. The energy absorbing panel of claim 17, wherein at least 40% of the fibers are oriented in the z-axis direction.

21. The energy absorbing panel of claim 17, wherein the fabric layers from the first bonded structure are perpendicular to the fabric layers of the second bonded structure.

22. The energy absorbing panel of claim 17, wherein the fibers are monoaxially drawn, thermoplastic fibers comprising a base layer of a strain oriented polymer sandwiched between two covering layers of a heat fusible polymer on the base layer, wherein the covering layer is characterized by a softening temperature below that of the base layer to permit fusion bonding upon application of heat.

* * * * *